United States Patent Office 3,390,134
Patented June 25, 1968

3,390,134
PREPOLYMER CRYSTALLIZATION AND SOLID
PHASE POLYMERIZATION
Charles Jacob Kibler, Kingsport, Tenn., assignor to Eastman Kodak Company, Rochester, N.Y., a corporation of New Jersey
No Drawing. Continuation-in-part of application Ser. No. 259,370, Feb. 18, 1963. This application Jan. 16, 1967, Ser. No. 609,322
10 Claims. (Cl. 260—75)

ABSTRACT OF THE DISCLOSURE

An improved solid phase polymerization process for building up the molecular weight of a linear polyester containing branched chain alkylene radicals, said improvement comprising, prior to build up, the preliminary crystallization in a volatile liquid (e.g., acetone, aqueous acetone, tetrachloroethane, methanol, ethyl acetate, etc.) of a prepolymer of said linear polyester containing branched chain alkylene radicals.

This application is a continuation-in-part of Kibler U.S. Ser. No. 259,370, filed Feb. 18, 1963, now abandoned.

This invention relates to an improved solid phase, vacuum-type polymerization process for rapidly building up the molecular weight of a linear polyester so as to attain an inherent viscosity of at least 0.7, said linear polyester containing branched chain alkylene radicals. In one of its more specific aspects, this invention relates to an improved solid phase, vacuum-type polymerization process wherein the improvement comprises the preliminary crystallization of a prepolymer of said linear polyester, said prepolymer being in the form of particles.

Solid phase, vacuum-type polymerization processes are well known in the polymer art. Examples of prior art which discuss this process include French Patent 1,081,-457, U.S. Patent 2,518,283, U.S. Patent 2,901,466, and U.S. Patent 2,921,052.

Linear polyesters containing branched chain alkylene radicals are also well known in the polymer art, as illustrated in the above-cited patents as well as in U.S. Patent 2,744,092, etc. It is, therefore, quite obvious that those skilled in the art need no elaborate explanation of how to prepare linear polyesters containing branched chain alkylene radicals, prepolymers thereof, or how to conduct a solid phase, vacuum-type polymerization process.

However, the prior art recognizes that it is sometimes difficult to apply the solid phase polymerization process to prepolymers containing branched chain alkylene radicals. Therefore, there is a need in the polymer industry for an improvement in the solid phase process to enable it to be advantageously applied to this type of prepolymer.

It is an object of this invention to provide an improved solid phase, vacuum-type polymerization process for rapidly building up the molecular weight of a linear polyester containing branched chain alkylene radicals.

It is a further object of this invention to provide an improved solid phase, vacuum-type polymerization process for obtaining linear polyesters containing branched chain alkylene radicals and having an inherent viscosity of at least 0.7.

Other objects of this invention will appear herein.

These and other objects are obtained through the practice of this invention, at least one embodiment of which comprises the process of (1) mixing particles of a prepolymer of a linear polyester containing branched chain alkylene radicals with a volatile liquid; (2) separating said volatile liquid and said prepolymer particles when said particles have become characterized by a high degree of crystallization; and (3) heating said crystallized prepolymer particles in an enclosed polymerization zone under a vacuum at from 5° C. to 80° C. below their melting point, whereby a linear polyester having an inherent viscosity of at least 0.7 and also at least 0.3 unit greater than for the prepolymer is obtained within about three hours of commencing said heating in said enclosed polymerization zone.

Through practice of the above-described embodiment of this invention, one can obtain highly advantageous properties for linear polyesters containing branched chain alkylene radicals. This is contrary to some theoretical considerations which have been advanced indicating that solid phase polymerization of a prepolymer could be more effectively conducted without any preliminary crystallization, or that no advantage would be derived from such a treatment.

The inherent viscosities mentioned in this application were determined by means of measurements at 25° C. employing 0.25 percent, by weight, concentrations of polymer dissolved in a solvent composed of 60 percent phenol and 40 percent tetrachloroethane.

In regard to the linear polyesters which can be employed in the practice of this invention, various patents can be referred to for details in preparing them and their prepolymers. For example, U.S. Patent 2,901,466, describes the preparation of prepolymers of linear polyesters prepared from terephthalate constituents, 1,4-cyclohexanedimethanol, and various branched chain glycols. These constituents can be modified by the presence of other constituents. U.S. Patent 2,727,882, describes the preparation of prepolymers wherein the acid constituent is terephthalic acid. In addition, U.S. Patent 2,744,089, discloses the preparation of prepolymers wherein the acid constituent is 4,4'-sulfonyldibenzoic acid. Other references listed hereinabove should also be referred to for disclosures relating to prepolymer preparation.

The prepoylmer particles encompassed by this invention have an inherent viscosity of from about 0.1 to about 0.40 and may be made by grinding solid prepolymers to to form particles which substantially completely pass a 20-mesh screen with less than 25 percent passing a 200-mesh screen. The screen mesh sizes mentioned here and elsewhere in this application are based upon the U.S. Sieve Series.

The mixing of the prepolymer with a volatile liquid in accordance with this invention effectuates a change in the prepolymer from an amorphous form to a form which has a high degree of crystallinity. By the term "volatile liquid" I mean a liquid which has a boiling point of 150° C. or below. The volatile liquid used in the preliminary crystallization step includes both solvents and nonsolvents for the particular prepolymer. The use of nonsolvents is permitted since, in a number of cases, there is no actual dissolving of the prepolymer particles. The use of either a solvent or a nonsolvent produces distinct advantages over the use of the other. Examples of liquids which can be employed here include alcohols having 1 to 15 carbon atoms, alkyl alkanoates having 1 to 15 carbon atoms, ketones having 1 to 15 carbon atoms, chlorinated hydrocarbons, etc. The volatile liquid may be a combination of one of the above-enumerated liquids and water to the extent that no more than about 75 percent by weight of the combination is water. The presence of water is permissible in order to reduce the hazards of fire or breathing toxic vapors from some volatile liquids.

Preferred volatile liquids are tetrachloroethane, perchloroethylene, methylene chloride, carbon tetrachloride, chloroform, aqueous acetone (of which mixture 25–75 percent by weight is water), anhydrous acetone, methanol, ethanol, isopropanol, butanol, aqueous methanol, aqueous ethanol, aqueous isopropanol, aqueous butanol, ethyl acetate, butyl acetate, etc. An especially preferred volatile liquid is a 50:50, by weight, mixture of acetone and water.

The prepolymer particles may be mixed with the volatile liquid in the ratio, by weight, of one part prepolymer to 2–25 parts volatile liquid.

The degree of crystallization of the prepolymer may

Items 1 through 4 on the following table will serve to further illustrate the invention by means of certain embodiments although it is to be understood that such illustrations and the preferred methods discussed above are not intended to limit the scope of the invention unless specifically indicated elsewhere herein. Items 5, 6, and 7 are presented for purpose of comparison in order to show the advantages of the invention.

EFFECT OF CRYSTALLIZATION ON THE VISCOSITY OBTAINED IN SOLID PHASE POLYMERIZATION AT 0.08 MM. Hg PRESSURE

| | Polyester Composition | | | | Prepolymer Inherent Viscosity | Build-Up Conditions | | Inherent Viscosities Obtained | |
|---|---|---|---|---|---|---|---|---|---|
| | Acid Components | | Glycol Components | | | | | | |
| | 1st | 2nd | 1st | 2nd | | Time (Hr.) | Temp., °C. | Not Crystallized | Crystallized |
| 1 | S | | Neopentyl | | 0.21 | 3 | 270 | 0.32 | 0.75 |
| 2 | S (83%) | I (17%) | do | | 0.17 | 3 | 270 | 0.31 | 1.09 |
| 3 | S (83%) | T (17%) | do | | 0.24 | 3 | 270 | 0.42 | 1.26 |
| 4 | S (75%) | I (25%) | do | | 0.16 | 3 | 250 | 0.20 | 0.95 |
| 5 | T | | Ethylene glycol | | 0.31 | 3 | 230 | 1.02 | 1.05 |
| 6 | T | | CHDM | | 0.30 | 3 | 260 | 1.10 | 1.20 |
| 7 | T (83%) | B (17%) | CHDM | | 0.37 | 3 | 240 | 1.23 | 1.29 |

S = 4,4′-Sulfonyldibenzoic Acid; T = Terephthalic Acid; I = Isophthalic Acid; B = Sebacic Acid.

be measured by various means, such as X-ray diffraction, density, melting point, etc. In addition, the crystallization of the prepolymer may be accelerated by stirring the mixture at room temperature for one hour to several days. The stirring time may be decreased to as little as five minutes if higher temperatures are employed.

If a solvent for the prepolymer is used as the volatile liquid, the prepolymer may be allowed to either completely or partially dissolve, after which the crystallized prepolymer may be obtained by adding a precipitant such as an alcohol (e.g., butanol, etc.), a ketone (e.g., acetone, etc.), or other similar precipitant. Alternatively, the solvent can be evaporated to obtain the crystallized prepolymer. After treatment with either a solvent or nonsolvent, the prepolymer is dried before introducing it into the solid phase, vacuum-type polymerization process.

The branched chain alkylene radicals of the linear polyester usable in this invention may be present as a part of either the acid constituent or the glycol constituent or both. Examples of acids and glycols containing a branched chain alkylene radical are disclosed in various patents, among which is the above-cited Kibler et al. U.S. Patent 2,901,466. Preferred such acids include α-ethylsuberic acid, α,α′-diethyladipic acid, dimethylmalonic acid, and ethylbutylmalonic acid. Preferred such glycols include 2,2-dimethyl-1,3-propanediol (neopentyl glycol), 2-methyl-1,5-pentanediol, and 2,2,4-trimethyl-1,3-pentanediol.

The linear polyesters of this invention melt at from about 150° C. to about 300° C. and are those of constituents (A) at least one difunctional dicarboxylic acid, at least 50 mole percent of said acid constituent being an acid having two carboxyl radicals attached to a hexacarbocyclic nucleus, and (B) at least one glycol, wherein at least 50 mole percent of said acid and glycol constituents have a branched chain alkylene radical.

The especially advantageous and surprising results of this invention are achieved by using the volatile liquid treatment process described above and more specifically illustrated by the following preferred methods.

METHOD I

A mixture of six liters of acetone and six liters of water in a 22 liter flask was stirred rapidly as six kg. of a pulverized prepolymer was added. This mixture was stirred for 24 hours at room temperature. The solid was filtered and dried.

METHOD II

Same as Method I except that 100 percent acetone was used. In this case, it may be necessary to regrind the prepolymer as it may tend to become a congealed mass before thoroughly crystallized.

The prepolymers which are set forth in the above table were prepared by the process described in U.S. Patent 3,075,952 granted on Jan. 29, 1963, to Coover et al. who are coworkers in the same laboratories of the same assignee as the present inventor. The prepolymers were ground to form particles which substantially completely pass a 20-mesh screen with less than 25 percent passing a 200-mesh screen. The samples of powder which were crystallized so as to illustrate this invention were treated by Method I in the case of Item 1 and by Method II as to the other items in the table which illustrate this invention.

As is apparent from the preceding disclosure, this invention provides a new and useful process for preparing a linear polyester of constituents (A) at least one difunctional dicarboxylic acid, wherein at least 50 mole percent of said acid constituent is an acid having two carboxyl radicals attached to a hexacarbocyclic nucleus and (B) at least one glycol, wherein at least 50 mole percent of said acid and glycol constituents have a branched chain alkylene radical, said linear polyester having an inherent viscosity in a mixture of 60 percent phenol and 40 percent tetrachloroethane of at least 0.7 and melting at from about 150° C. to about 300° C., said process comprising:

(1) mixing one part by weight of particles of a prepolymer of said linear polyester, said prepolymer having an inherent viscosity of from about 0.1 to about 0.40, which particles substantially completely pass a 20-mesh screen with less than 25 percent passing a 200-mesh screen, with from about 2 to about 25 parts by weight of a volatile liquid composed of (a) up to 75 percent by weight of water and (b) a compound selected from the group consisting of alcohols having 1 to 15 carbon atoms, alkyl alkanoates having 1 to 15 carbon atoms, ketones having 1 to 15 carbon atoms, and chlorinated hydrocarbons, (2) separating said volatile liquid and said prepolymer particles when said particles have become characterized by a high degree of crystallinity, and (3) heating said crystallized prepolymer particles in an enclosed polymerization zone under a vacuum at from 5° C. to 80° C. below their melting point, whereby a linear polyester having an inherent viscosity of at least 0.7 and also at least 0.3 units greater than for the prepolymer is obtained within about three hours of commencing said heating in said polymerization zone.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A process for preparing a linear polyester of constituents (A) at least one difunctional dicarboxylic acid, wherein at least 50 mole percent of said acid constituent is an acid having two carboxyl radicals attached to a hexacarbocyclic nucleus and (B) at least one glycol, wherein at least 50 mole percent of said acid and glycol constituents have a branched chain alkylene radical, said linear polyester melting at from about 150° C. to about 300° C., said process comprising:

(1) mixing one part by weight of particles of a prepolymer of said linear polyester, said prepolymer having an inherent viscosity of from about 0.1 to about 0.40, which particles substantially completely pass a 20-mesh screen with less than 25 percent passing a 200-mesh screen, with from about 2 to about 25 parts by weight of a volatile liquid composed of (a) up to 75 percent by weight of water and (b) a compound selected from the group consisting of alcohols having 1 to 15 carbon atoms, alkyl alkanoates having 1 to 15 carbon atoms, ketones having 1 to 15 carbon atoms, and chlorinated hydrocarbons, (2) separating said volatile liquid and said prepolymer particles when said particles have become characterized by a high degree of crystallinity, and (3) heating said crystallized prepolymer particles in an enclosed polymerization zone under a vacuum at from 5° C. to 80° C. below their melting point, whereby a linear polyester having an inherent viscosity of at least 0.7 and also at least 0.3 units greater than for the prepolymer is obtained within about three hours of commencing said heating in said polymerization zone, said inherent viscosities being measured at 25° C. with a 0.25 percent by weight solution of the polymer in a solvent composed of 60 percent phenol and 40 percent tetrachloroethane.

2. A process as defined by claim 1 wherein said volatile liquid is a member selected from the group consisting of tetrachloroethane, perchloroethylene, methylene chloride, carbon tetrachloride, chloroform, aqueous acetone, anhydrous acetone, methanol, ethanol, isopropanol, butanol, aqueous methanol, aqueous ethanol, aqueous isopropanol, aqueous butanol, ethyl acetate, and butyl acetate, said aqueous liquids containing from 25 to 75 percent by weight of water.

3. A process as defined by claim 1 wherein said volatile liquid is a mixture of equal weights of acetone and water.

4. A process as defined by claim 1 wherein said volatile liquid is acetone.

5. A process as defined by claim 1 wherein said difunctional dicarboxylic acid having a hexacarbocyclic nucleus is 4,4'-sulfonyldibenzoic acid.

6. A process as defined by claim 1 wherein said dibasic acid having a hexacarbocyclic nucleus is terephthalic acid.

7. A process as defined by claim 1 wherein said glycol is neopentyl glycol.

8. A process as defined by claim 1 wherein said prepolymer is of 4,4'-sulfonyldibenzoic acid and neopentyl glycol.

9. A process as defined by claim 1 wherein said prepolymer is of 4,4'-sulfonyldibenzoic acid, isophthalic acid, and neopentyl glycol.

10. A process as defined by claim 1 wherein said prepolymer is of 4,4'-sulfonyldibenzoic acid, terephthalic acid, and neopentyl glycol.

References Cited
UNITED STATES PATENTS

| | | | |
|---|---|---|---|
| 2,706,722 | 4/1955 | Caldwell | 260—32.8 |
| 2,901,466 | 8/1959 | Kibler et al. | 260—75 |
| 3,014,011 | 12/1961 | Zoetbrood | 260—75 |
| 3,075,952 | 1/1963 | Coover et al. | 260—75 |

WILLIAM H. SHORT, *Primary Examiner.*

LOUISE P. QUAST, *Examiner.*